US010666655B2

(12) United States Patent
Diaz Cuellar et al.

(10) Patent No.: US 10,666,655 B2
(45) Date of Patent: May 26, 2020

(54) SECURING SHARED COMPONENTS

(71) Applicant: Microsoft Technology Licensing, LLC, Redmond, WA (US)

(72) Inventors: Gerardo Diaz Cuellar, Kirkland, WA (US); Navin Narayan Pai, Seattle, WA (US); Ivan Dimitrov Pashov, Woodinville, WA (US); Giridhar Viswanathan, Redmond, WA (US); Benjamin M. Schultz, Bellevue, WA (US); Hari R. Pulapaka, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 15/818,481

(22) Filed: Nov. 20, 2017

(65) Prior Publication Data

US 2019/0158497 A1    May 23, 2019

(51) Int. Cl.
*H04L 29/06* (2006.01)
*G06F 21/31* (2013.01)

(52) U.S. Cl.
CPC .............. *H04L 63/10* (2013.01); *G06F 21/31* (2013.01); *H04L 63/0281* (2013.01); *H04L 63/083* (2013.01); *H04L 63/108* (2013.01)

(58) Field of Classification Search
CPC ..... H04L 63/10; H04L 63/083; H04L 63/108; H04L 63/0281; G06F 21/31
See application file for complete search history.

(56) References Cited

U.S. PATENT DOCUMENTS

| 8,959,533 | B2* | 2/2015 | VanBlon | G06F 9/451 |
| | | | | 719/319 |
| 10,326,650 | B2* | 6/2019 | Kimer | H04L 41/0813 |
| 2006/0265508 | A1* | 11/2006 | Angel | H04L 29/12047 |
| | | | | 709/230 |
| 2008/0307425 | A1* | 12/2008 | Tripathi | G06F 9/5077 |
| | | | | 718/104 |
| 2014/0101675 | A1* | 4/2014 | VanBlon | G06F 9/451 |
| | | | | 719/319 |
| 2015/0249651 | A1* | 9/2015 | Okamoto | H04L 63/08 |
| | | | | 713/171 |
| 2016/0119198 | A1* | 4/2016 | Kfir | H04L 63/1408 |
| | | | | 709/224 |
| 2018/0063270 | A1* | 3/2018 | Naar | H04L 67/02 |

* cited by examiner

*Primary Examiner* — Abu S Sholeman
(74) *Attorney, Agent, or Firm* — Liang IP, PLLC

(57) ABSTRACT

Providing access control by a first operating system. A method includes receiving at the first operating system, from the second operating system, a request for a bounding reference to a set having at least one resource. A bounding reference for the set is obtained. The bounding reference comprises a reference created from a first operating system resolvable reference to the set. The method further includes providing the obtained bounding reference for the obtained provided bounding reference to the second operating system. A request, including the obtained bounding reference and an identifier identifying the second operating system for the set, is received from the second operating system. The obtained bounding reference and the identifier identifying the second operating system are evaluated. As a result of evaluating the obtained bounding reference and the identifier identifying the second operating system, a resource control action is performed.

20 Claims, 4 Drawing Sheets

_400_

402
Receive At The First Operating System, From The Second Operating System, A Request For A Bounding Reference To A Set Having At Least One Resource

404
Obtain A First Operating System Provided Bounding Reference For The Set

406
Provide The Obtained Bounding Reference To The Second Operating System

408
Receive From The Second Operating System, A Request For The Set, Wherein The Request For The Set Comprises The Obtained Bounding Reference And An Identifier Identifying The Second Operating System

410
Evaluate The Obtained Bounding Reference And The Identifier Identifying The Second Operating System

412
As A Result Of Evaluating The Obtained Bounding Reference And The Identifier Identifying The Second Operating System, Perform A Resource Control Action

FIG. 4

SECURING SHARED COMPONENTS

BACKGROUND

Background and Relevant Art

Virtual machine-based virtualization provides many of the isolation benefits of physical machines while offering flexibility and density. Container-based virtualization provides a lighter weight virtualization environment, improved compatibility and lower operational costs. In a containerized based configuration approach, various hierarchical configuration layers are used to configure entities such as containerized operating systems. Additionally, filters can be applied to configuration layers to accomplish the desired configuration for an entity. In particular, an entity, such as a container operating system kernel, can have different portions of different configuration layers exposed to it from a host operating system such that configuration from different configuration layers can be used to configure the containerized entity, but where the containerized entity operates as if it is running in its own pristine environment, even though it is using physical elements from the host operating system. Thus, a given configuration layer could be used as part of a configuration for multiple different containerized entities thus economizing storage, network, and compute resources by multi-purposing them for different container operating systems.

Today, many server scenarios are adopting containers both in the enterprise and in the cloud. While enterprise and cloud computing reap the benefits, containers also hold promise in client applications. Beyond providing a great software development environment, containers will provide the next generation of features around security and isolation.

As intimated above, containers achieve their lightweight attributes through sharing aspects of the host operating system. This may include sharing of files and folders, sharing configuration, sharing devices, and sharing operating system services (sometimes referred to as daemons). In some environments, such as friendly multi-tenant hosting, systems may de-duplicate overlapping processes, enabling even more efficient resource utilization. Operating system services are a contributor to process overlap.

There are methods to share processes and information between containers and the host. However, stateful communications across an isolation boundary must be appropriately monitored and accounted for. Without an isolation boundary, this accounting is done with handles (i.e., an abstract reference to a resource), pointers, access to host data structures, etc. Without any additional isolation, unwanted communication and leakage can occur across the isolation boundary. In particular, nefarious entities can obtain access to the handles and pointers and use them to wreak havoc on the host operating system by performing unauthorized requests, accesses, and changes to resources.

The subject matter claimed herein is not limited to embodiments that solve any disadvantages or that operate only in environments such as those described above. Rather, this background is only provided to illustrate a few exemplary technology areas where some embodiments described herein may be practiced.

BRIEF SUMMARY

One embodiment illustrated herein includes a method that may be practiced in a container based computing environment including a computing system having a first operating system and a second operating system. The method includes acts for providing access control by the first operating system. The method includes receiving at the first operating system, from the second operating system, a request for a bounding reference to a set having at least one resource. The method further includes obtaining a first operating system provided bounding reference for the set, wherein the bounding reference comprises a reference created from a first operating system resolvable reference to the set where the bounding reference is created in a fashion to prevent the second operating system from directly accessing the set using the bounding reference. The method further includes providing the obtained bounding reference to the second operating system. The method further includes receiving from the second operating system, a request for the set, wherein the request for the set comprises the obtained bounding reference and an identifier identifying the second operating system. The method further includes evaluating the obtained bounding reference and the identifier identifying the second operating system. The method further includes as a result of evaluating the obtained bounding reference and the identifier identifying the second operating system, performing a resource control action (e.g. providing the resource to the second operating system, providing a token granting access to the resource to the second operating system, denying the second operating system access to the resource, etc.).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4 illustrates a method of providing access control to resources.

DETAILED DESCRIPTION

Figure 1:
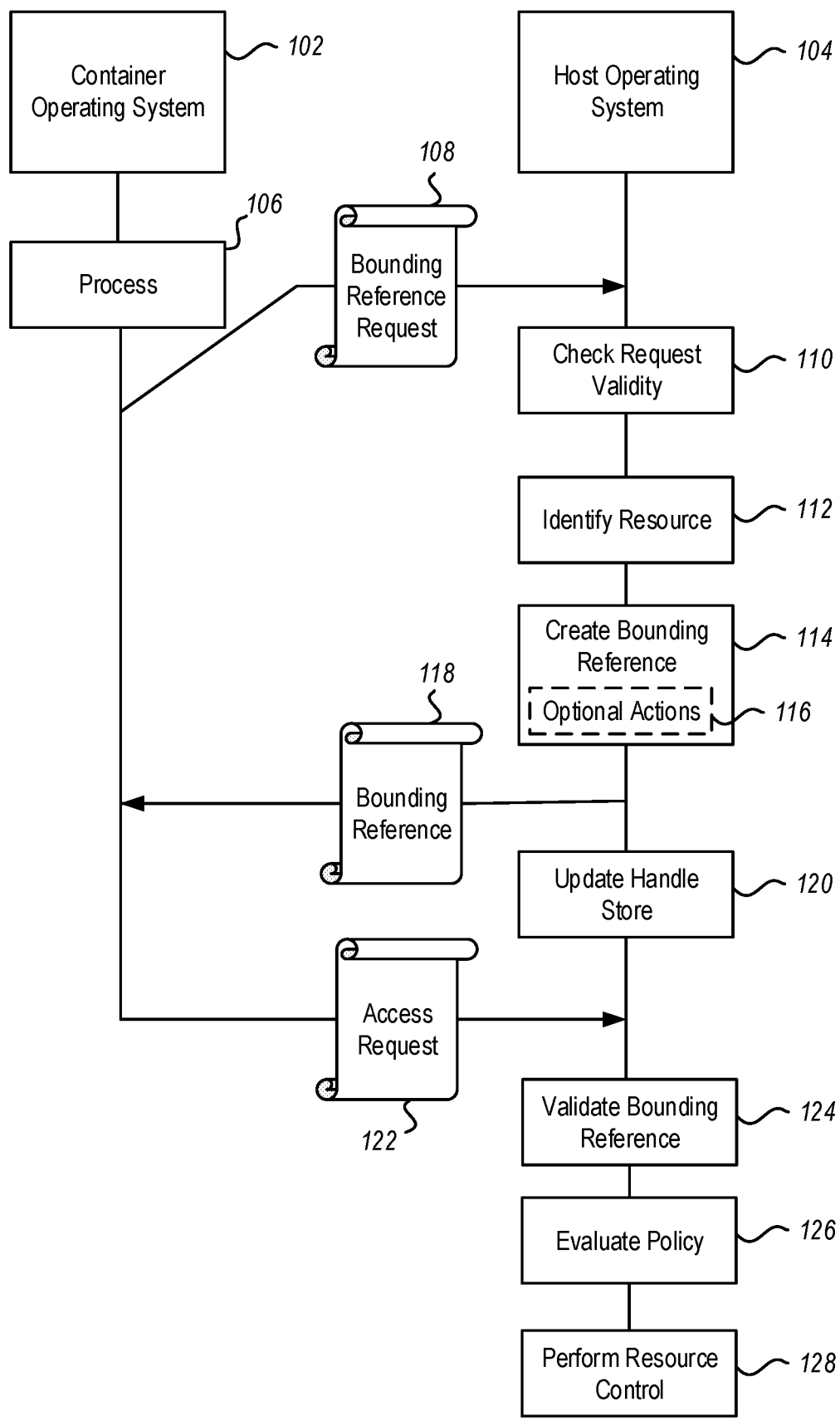
FIG. 1 illustrates a container operating system and a host operating system interacting with each other for the host operating system to control access to resources to the container operating system.

Embodiments illustrated herein include functionality for a container operating system (sometimes referred to herein simply as 'container') being able to request access to resources from a host operating system (sometimes referred to herein simply as 'host') in a secure way that maintains an isolation barrier between the container and the host. For example, reference is made to FIG. 1 which illustrates a container operating system 102 and a host operating system 104. The container operating system 102 identifies that the resource needs to be obtained. For example, such resources may include IP addresses, connections, files, web pages, time resolution, or virtually any other resource. The container operating system 102 performs processes as illustrated at 106 to generate a resource bounding reference request 108. The resource bounding reference request 108 is sent to the host operating system 104. As illustrated at 110, the host operating system 104 checks the request validity. The host operating system 104 also identifies the resource as illustrated at 112. The host operating system 104 also creates a bounding reference as illustrated at 114. The bounding reference 118 is created from a host resolvable reference. For example, the host resolvable reference may be a handle (e.g., an abstract reference to a resource), a pointer, a table entry, etc. The bounding reference 118 is typically created in a way that prevents the container operating system 102 from directly identifying the host resolvable reference using just the bounding reference.

As will be discussed in more detail below, the host operating system 104 is also able to perform various optional actions as illustrated at 116 in conjunction with creating the bounding reference. Briefly, some of these optional actions may include encrypting the bounding reference, obfuscating the bounding reference, adding a layer of indirection, applying a time factor to the bounding reference, performing various monitoring and/or machine learning functions, etc.

The bounding reference 118 is sent from the host operating system 104 to the container operating system 102. The host operating system 104 also updates a handle store as illustrated at 120. As will be discussed in more detail below, the handle store correlates bounding references to containers. This allows the host operating system 104 to revalidate when a particular container uses a particular bounding reference to request a resource. That is, the host operating system 104 can determine that a particular container matches a particular bounding reference when the container sends the bounding reference to the host operating system 104 by referencing the handle store.

Returning once again to the present example, the container operating system 102 can then use the bounding reference 118 to generate an access request 122 which can be sent from the container operating system 102 to the host operating system 104 to request the resource.

At the host operating system 104, as illustrated at 124, the bounding reference is validated. Validation may include confirming that the bounding reference 118 identified in the access request 122 correlates with the container operating system 102. Thus, the host operating system 104 is able to determine that the only entity authorized to provide the bounding reference 118 in the access request 122 is the container operating system 102 (or some other container operating system in a set of container operating systems allowed to use the bounding reference 118). If a different entity attempts to use the bounding reference 118 to request the resource, the host operating system 104 will determine at 124 that the request is invalid.

FIG. 1 further illustrates that the host operating system 104 is able to evaluate policy as illustrated at 126. Evaluating policy may include a number of different actions that will be discussed in more detail below. Briefly, evaluating policy may include actions to determine the nature of the access request 122 for making various decisions regarding control of the resource (such as, for example, determining if the bounding reference 118 is being used in a denial of service (DoS) attack). Thus, as illustrated at 128 in FIG. 1, the host operating system 104 performs resource control dependent on evaluating policy as illustrated at 126. Various resource control options will be discussed in more detail below, but briefly, such actions may include, for example, providing the resource, providing additional tokens to allow access to the resource, blocking access to the resource, destroying the container operating system 102, or some other appropriate resource control action.

As noted, embodiments illustrated herein are particularly useful for maintaining isolation between the container operating system 102 and the host operating system 104 on the computer system 100 creating a more secure computing system. There are several challenges to providing isolation that various embodiments may be configured to handle. Such challenges may include ensuring that when service information is stored in a secure, isolated location and shared with multiple isolated containers, that it not be spoofed or tampered with. Alternatively or additionally, such challenges may include ensuring that stateful services and the associated transactions are not repudiated. Alternatively or additionally, such challenges may include ensuring that there is no information disclosure or leakage across the isolation boundary. Alternatively or additionally, such challenges may include mitigating any escalation of service or denial of service across the isolation boundary. Various embodiments illustrated herein may be able to address one or more of these challenges.

Embodiments illustrated herein include a secure location (e.g., the handle store discussed above), where accounting and tracking of communications across the isolation boundary occur. For example, if this secure location is at the host, then it creates the appropriate infrastructure to create/randomize handles (or other host resolvable references), allocate the handles, and track the handles (note that when handles are illustrated herein, it should be appreciated that other references may be used in alternative embodiments). It also defines an extensible monitoring and enforcement mechanism to provide visibility into the communications that cross the isolation boundary.

Thus, embodiments may include functionality to track and maintain service communication across an isolation boundary. In some embodiments, this may include tracking container and host identities and authorization levels. This may additionally or alternatively include creating and maintaining one or more handle tables. This may additionally or alternatively include managing metadata associated with each communication handle to perform a mapping to anonymize any information that crosses the security boundary.

Some embodiments may include functionality to negotiate version information across the isolation boundary. Some embodiments may include functionality to share data schemas across the isolation boundary. Some embodiments may include functionality to monitor communications that cross the isolation boundary. Some embodiments may include functionality to enforce communications that cross the isolation boundary.

Figure 2:
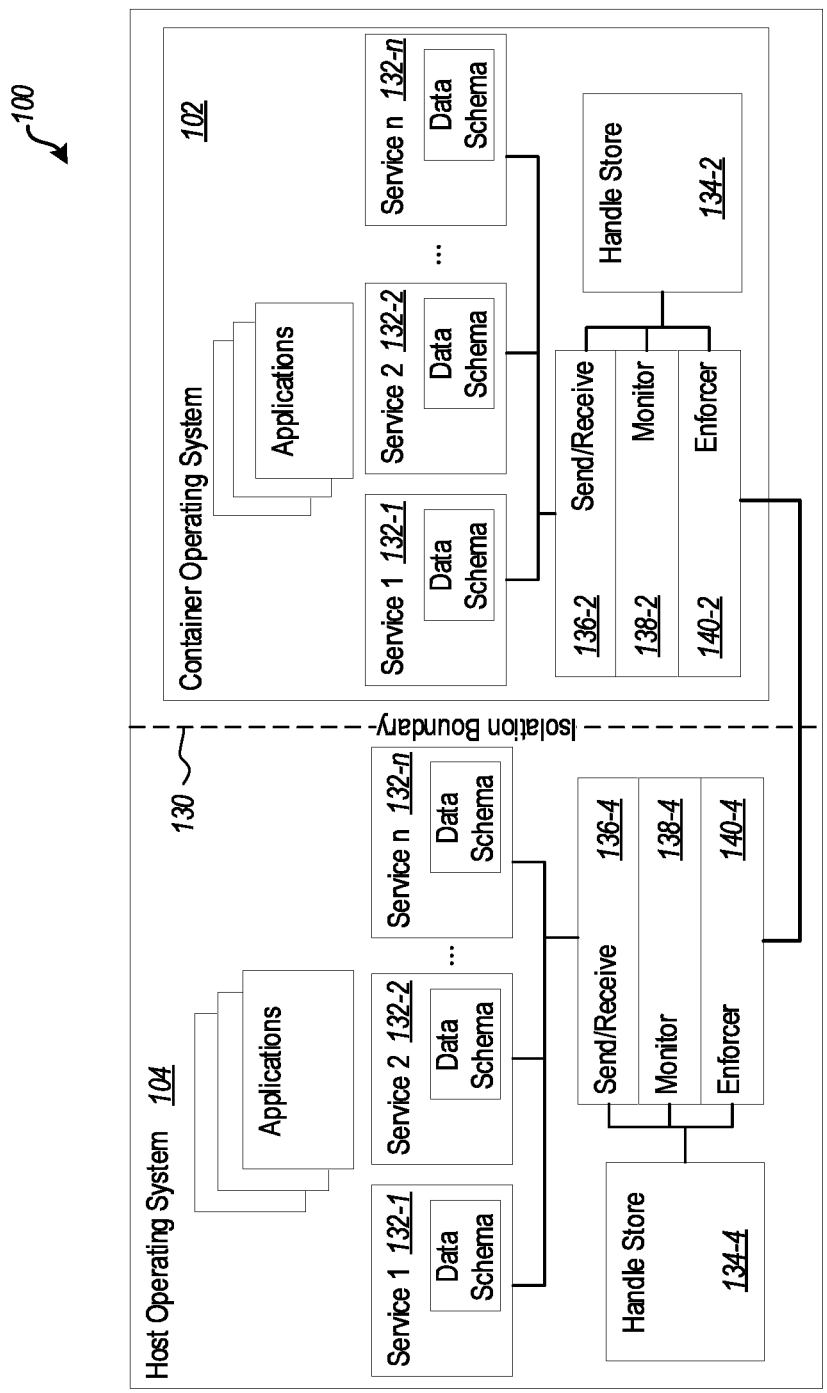
FIG. 2 illustrates a container operating system hosted on a host operating system.

An example system architecture is now illustrated. Reference is now made to FIG. 2. FIG. 2 is an architecture diagram with components as explained below. Note that the operating system instances are typically connected to share data. This may be a network connection, a named pipe, an RPC channel, shared memory or something similar. Note that the monitor component and enforcement component are optional on a remote operating system (such as the container operating system 102). Additionally, some embodiments may not have these components.

There are many operating system processes and services may need to share information between the container and the host. Benefits to better sharing may include one or more of: more efficient operation of a computing system due to the sharing of resources, a higher density of containers by sharing of resources, and/or using a trusted broker to achieve better security and isolation. These services may include network services such as DNS and web proxy, time services, settings synchronization services (display settings, language settings, accessibility, etc.), telemetry settings, policy settings (group policy, MDM, security policy) and many others.

Some embodiments can achieve one or more these benefits while maintaining isolation. In some scenarios, containers are used to isolate one or more applications (or other processes) from a pristine, secure host. These applications, for example, could be used to access Internet resources (such as websites and files) from locations in which they may accidentally download malware or attack software as well. In this environment, the container is assumed to be insecure, and the host is behaving as the trusted broker, running the service and optionally caching the results. To achieve isolation, embodiments include functionality for sharing information and object references between the host and the container (or even from container to container) in a way that is secure and unexploitable across the information boundary.

FIG. 2 illustrates how the implementation of some embodiments impacts communications between the host and the container. However, an embodiment may apply between any two entities that share a service (or other process), whether they be a host, a container, or a network node (such as a web proxy or firewall).

FIG. 2 illustrates computing system 100. The computing system may include various hardware resources, such as physical processors, physical memory, physical storage such as hard drives, networking hardware, input/output hardware, etc. These hardware resources may be configured to implement the various components of the system described herein. In some embodiments, this may be accomplished by processors executing instructions stored in the physical memory and/or physical storage to implement the components. This may alternatively or additionally include using other hardware resources to implement the components.

FIG. 2 further illustrates a host operating system 104 implemented on the computing system 100. This host operating system 104 is an operating system that has the capabilities to host additional operating system instances such as container operating systems. A single container operating system 102 is shown, but it should be appreciated that multiple container operating systems could be, and indeed are implemented typically. Indeed, much of the efficiency of systems illustrated herein can be obtained by sharing resources at the computing system 100 and the host operating system 104 among multiple different container operating systems.

FIG. 2 further illustrates an isolation boundary 130 between the host operating system 104 and one or more container operating systems. Notably, some embodiments implement similar boundaries between different container operating systems. Indeed, while the examples illustrated herein are generally illustrated in the context of a host operating system and a container operating system, it should be appreciated that embodiments may use the principles illustrated herein to implement access control to resources by one container operating system to another container operating system. Thus, isolation boundaries such as isolation boundary 130, may be implemented between container operating systems.

As noted above, the computing system 100 includes one or more container operating systems, represented by the container operating system 102. The container operating system 102 is an operating system that runs one or more applications (or other processes) that require isolation from the host operating system 104.

The computing system includes services or processes, labeled as "Service 1 132-1, Service 2 132-2, Service n 132-n". These components run the operating system services for the various operating systems as mentioned above. Each operating system service maintains its own data schema to communicate beyond the boundaries of its service. Each operating system service also maintains a version number to ensure compatibility with other instances of the service that run remotely.

The computing system further includes a handle store (illustrated at handle store 134-2 and handle store 134-4, but referred to generally as handle store 134) for each operating system. The handle store 134 is a component that tracks the identity of the remote endpoints (e.g. container, host, etc.), system resolvable references, and bounding reference created from the system resolvable references. In the following examples, handles are used as examples of the system resolvable references, but it should be appreciated that in other embodiments, other system resolvable references may be used. For each open handle to a remote endpoint, the handle store 134 calculates and creates a handle identifier (i.e., a bounding reference for the handle) to use across the isolation boundary 130. In some embodiments, the handle identifier is randomized, untrackable, unguessable, and/or otherwise protected or obfuscated by the host operating system 104.

For example, as discussed previously, the host operating system 104 may perform optional actions as illustrated at 116 in FIG. 1. Some of the optional actions may include encrypting the bounding reference. Thus, for example, the bounding reference may be encrypted so that it is unreadable by the container operating system 102 or any other entity for that matter, without an appropriate key. In some embodiments, the host operating system 104 may provide the container operating system 102 with a key that can be used to decrypt an encrypted bounding reference. The container operating system 102 may use the key to re-encrypt the bounding reference when used to request resources. The host operating system may use the key (or a corresponding key) to decrypt the bounding reference encrypted by the container operating system 102.

Some of the optional actions may include obfuscating the handle. For example, in some embodiments, the bounding reference may identify a location, but the identified location may not be the actual location of a reference referred to by the handle. Thus, for example, in a DNS scenario, the IP address bounding reference provided by the host operating system 104 to the container operating system 102 may be obfuscated to 104.43.195.251, where the actual IP address for the corresponding handle is 23.96.52.53. This obfuscation is typically random, but could be implanted in other less random ways, in other embodiments. Thus, for example, an external IP address can be mapped to an IP address that is only known to the host operating system 104 and the container operating system 102. The handle store 134-4 could maintain a table to correlate obfuscated bounding references to host resolvable references. The bounding reference may not refer to the actual location. However, the bounding reference can be resolved using the handle store 134-4.

Some of the optional actions may include adding a layer of indirection for the bounding reference. In some embodiments, a layer of indirection is used to encapsulate or hide information from the container operating system 102. For example, if an application running in a container requires location information, the host operating system 104 may provide a reference to an object that only contains latitude and longitude. Any additional metadata and hardware or driver information are obscured from the container operating system 102. The benefits of this may include defense in depth, better compatibility, etc.

Some of the optional actions may include applying a time factor to the bounding reference. For example, a given bounding reference may be correlated to a specific version of a resource or a specific handle. If the bounding reference 118 is returned in the access request 122, it can only be used to obtain the specific version, in spite of the fact that the resource may have been updated to a new version after the bounding reference 118 is provided from the host operating system 104 to the container operating system 102. If the container operating system 102 needs access to the updated resource, the container operating system 102 will need to obtain a new bounding reference from the host operating system 104. Note that in some embodiments, the bounding reference may be valid for a particular period of time, including in a fashion such that any updates made during that time can be returned to the container operating system 102. For example, consider the case where bounding reference 1 is issued for time period 1. During time period 1, a resource is updated from A to A' and then to A". Bounding reference 2 is issued for time period 2. During time period 2, the resource A" is updated to A'". In this example, if the access request 122 includes bounding reference 1, then resource A" is available to the container operating system 102. If bounding reference 2 is included in the access request 122, then resource A'" is available to the container operating system 102.

The handle store 134 may also store metadata such as the handle identifier and a timestamp associated with a connection, and how it is mapped to the remote connection to ensure no data leakage occurs. Note that the handle store 132-2 on the container operating system 102 may reuse all or part of the handle store 132-4 on the host operating system 104. In particular, the handle store 132-4 may have portions filtered (or not) and provided to the container operating system 102. The container operating system 102 may be able to store additional information that can be maintained in conjunction with the handle store 132-4 to form the handle store 132-2. In other embodiments, the handle store 132-2 may simply be the handle store 132-4 without modification, and thus (at least partially) the same entity as the handle store 132-4. Note that in some embodiments, the host operating system may not have a handle store, and there will be handle store 134-2 in a container that runs many of the services and shares handles with additional containers. In other embodiments, the host operating system 104 may implement the only handle store 134-4, and one or more container operating systems may depend on handle store 134-4 as the only handle store.

The computing system further includes a sender/receiver (examples of which are shown at sender/receiver 136-2 and sender/receiver 136-4, but referred to generally as sender/receiver 136) for each operating system that is used to route cross-container communications across one or more isolation boundaries. This component may be implemented through a named pipe, a remote procedure call, and/or something similar. Again, the sender/receivers 136-2 and 136-4 may be (at least partially) the same entity according to containerization principles described previously herein.

The computing system further includes a monitor (examples of which are shown at monitor 138-2 and monitor 138-4, but referred to generally as monitor 138), for each operating system, that performs monitoring on what information is sent across the isolation boundary 130. The monitor 138 may get additional context through the handle store 134. For additional visibility, the monitor 138 may also have a plug-in model in which services provide their data schemas and state machines. The monitor 138 may send alerts to the operating system if unexpected information or unexpected communication attempts are observed. The monitor 138 may also record what it monitors to a log. This log may be a file, an event stream, a database, etc. It also can be sent via telemetry to a remote system for current or future analysis. Machine learning may be applied on the container operating system 102, the host operating system 104 or the remote system to determine if the observed behavior matches the expected behavior. Notifications may be sent to the enforcer 140-2 and 140-4 to update their models of expected behavior based on the analysis. Note that the monitors 138-2 and 138-4 may be (at least partially) the same entity according to containerization principles.

The computing system further includes an enforcer (examples of which are shown at enforcer 140-2 and enforcer 140-4, but referred to generally as enforcer 140) for each operating system, that performs enforcement across an isolation boundary. In some embodiments, the enforcer 140 has a set number of resource controls or quality of service metrics for each communication stream it owns. In some embodiments, the enforcer 140 may receive alerts from the monitor 138 that unexpected information is being transferred. The enforcer 140 may then determine that the communication across the security boundary is in violation and stop the communication. Again, the enforcers 140-2 and 140-4 may be (at least partially) the same entity according to containerization principles The following illustrates a functional example used in a Domain Name Service (DNS) example. However, it should be appreciated that other embodiments may be used in other scenarios or other environments such as time services, settings synchronization services (display settings, language settings, accessibility, etc.), telemetry settings, policy settings (group policy, MDM, security policy) and many others.

Figure 3:
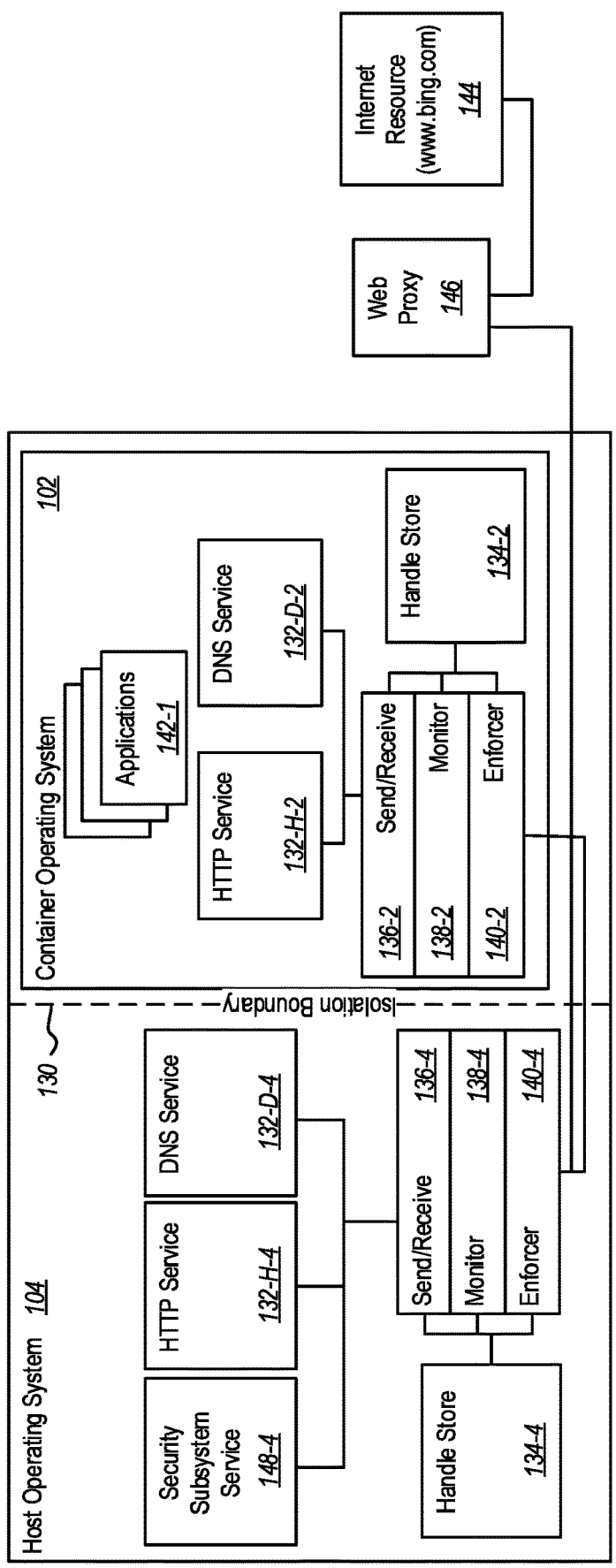
FIG. 3 illustrates an example of a container operating system attempting to access a web resource.

In the present illustration shown in FIG. 3, a concrete example of how an application that is running in the container operating system 104 accesses a resource on the Internet such as a website (www.bing.com) is shown. In the illustrated example, a distributed DNS service 132-D is shown.

In this scenario, the application 142-1 in the container operating system 102 queries the HTTP client 132-H-2 for an internet resource 144, which in the present example, is a webpage for a website (www.bing.com). Note the HTTP client component may be implemented as a service, a process or a set of components that run with a web browser. This opens a socket connection by name to www.bing.com and results in the DNS service 132-D-2 in the container operating system 102 is queried for the IP address of the internet resource 144. The DNS service 132-D-2 in the container queries the sender/receiver 136-2 to see if it has access to the DNS service 132-D-4 instance on the host operating system 104. If it does not, the sender/receiver 136-2 initiates a session through the sender/receiver 136-4 to the DNS service 132-D instance on the host operating system 104. As the session is legitimate, the monitor 136-2 and enforcer 140-2 components merely log the transaction. The monitor 136-4 and enforcer 140-4 also ensure the session is legitimate and merely log the transaction. Note that there are at least three alternative embodiments. In a first embodiment, the monitor and enforcer are tightly coupled with the local handle store. For example if the container operating system 104 is querying the handle store 134-4 on the host operating system 104, the host monitor 138-4 and enforcer 140-4 are doing the work. In a second embodiment, the monitor and enforcer are auditing transactions for future investigations; and implement a defense in depth so that the querying entity (in this case the container operating system 102) does not accidently corrupt the existing data structure. In a third embodiment, one container operating system 102 is maintaining the services and handle store for other containers. This is similar to the first embodiment, except the interactions are container to container and not container to host and vice versa.

Note the first embodiment could be implemented in the container if other operating systems were using that container's handle store such as in the third embodiment. Note the second embodiment is "best effort" because in the illustrated example, if the container operating system 102 is infected with some malicious attack software, other components running in the container operating system 102 cannot be trusted.

The sender/receiver 136-4 on the host notifies the DNS service 132-D-4 on the host operating system 104 and creates a handle. This handle is logged in the handle store 134-4 and then the handle store 134-4 generates a record that includes [1] the handle (i.e., a host resolvable reference) that is provided by the DNS service 132-D-4 on the host operating system 104 [2] the container name for the container operating system 102, and [3] the handle store 134-4 calculates and stores a randomized ID (i.e., a bounding reference) that is mapped to a handle, which is a reference to the real object, i.e., in the present example, an IP address for the internet resource 144. The randomized ID is an example of a bounding reference. This randomized ID (i.e., bounding reference) is provided to the instance of DNS service 132-D-2 running in the container. Note that this randomized ID may be implemented to have significant entropy so it cannot be guessed. This could be implemented with a cryptographic hash function such as SHA-2 or using some other appropriate mechanism. This randomized ID may be used as a handle directly in the container operating system 102, or alternatively, the container operating system 102 may use its own handle store 134-2 and sender/receiver 136-2 to anonymize the handle.

When the session is up, the DNS service 132-D-4 on the host operating system 104 may either have the IP address of www.bing.com in its cache or alternatively query the local DNS server for the IP address (not illustrated). When it has the IP address, it returns it to the DNS service 132-D-2 in the container operating system 102. Now the HTTP client 132-H-2 in the container sends an HTTP get request to the IP address www.bing.com. This is sent through a web proxy 146. The web proxy 146 sends a challenge response back to the HTTP client 132-H-2 in the container operating system 102 because entities on the network must be authenticated to the web proxy 146 to have access to the Internet. Upon receiving this web proxy challenge, the HTTP client 134-H-2 in the container operating system 102. notifies the sender/receiver 136-4 on the host operating system 104. The sender/receiver 136-4 creates a handle. This handle is logged in the handle store 134-4 and then the handle store 134-4 generates a record that includes [1] the handle (i.e., a host resolvable reference) that is provided by the HTTP client 132-H-2 on the container operating system 102 [2] the container name for the container operating system 102, and [3] the handle store 134-4 calculates and stores a randomized ID (i.e., a bounding reference) that is mapped to a handle, which is a reference to the real object. The randomized ID is an example of a bounding reference as used herein. The randomized ID is provided, as a bounding reference, to the instance of the HTTP client 134-H-2 running in the container operating system 102.

The HTTP client 132-H-2 in the container operating system 102 forwards the challenge request from the web proxy 146 to the security subsystem service 148-4 in the host operating system 104 using the randomized ID it was provided (and its container name). Note that in some embodiments there is not a 1:1 mapping to the same service. In this case the security subsystem service 148-4 is shared with the container operating system 102. The security subsystem in the host operating stem 104, evaluates the handle, the randomized ID, along with the container name, and if the randomized ID matches the container name from the handle store 134-4, then the host 104 generates the challenge response and sends it to the HTTP client 132-H-2 in the container operating system 102. The HTTP client 132-H-2 in the container operating system 102 then sends the web proxy 146 this challenge response. The web proxy 146 then sends the HTTP client 132-H-2 in the container operating system 102 a token so it can demonstrate authentication is completed. The HTTP client 132-H-2 in the container operating system 102 then sends the HTTP get requests to the internet resource 144 through the web proxy 146 and is able to download the web information for the application 142-1 running in the container operating system 102.

When embodiments are used to implement a DNS, various alternatives can be implemented. For example, in some embodiments, the container operating system 102 is only able to reuse the cache in the DNS service 132-D-4. This is an example where the DNS cache on the host is read-only.

In an alternative embodiment, the container operating system 102 may include functionality that enables the container operating system 102 to contribute to the cache for the DNS service 132-D-4 on the host operating system 104. This is an example where the container operating system 102 has read-write access to the cache for the DNS service 132-D-4. For example, in some such embodiments, the container operating system 102 modifies the DNS cache on the host via direct memory writes.

Alternatively or additionally, some implementations do copy-on-write, but shared with multiple containers. That is, changes to a DNS cache may be viewable by multiple different container operating systems. In some such embodiments, container operating systems can be grouped. For example, embodiments may group containers having shared DNS cache entries. For example, container operating systems may be grouped by image type, such that container operating systems based on the same image have visibility to the same changes to the DNS cache entries.

In some embodiments where DNS cache entries are shared across container operating systems, a shared DNS cache may be seeded with all, or portions of, the host DNS cache on the host operating system 104. The various container operating systems in a group may then contribute to a shared DNS cache with (at least a portion of) the host DNS cache underlying the shared DNS cache.

In some embodiments, an untrusted container operating system may be allowed to use the DNS cache on the host as an underlying cache, but then adds its own unique data to a local DNS cache for the container operating system. In this way, the untrusted container operating system is not able to make changes to the host DNS cache, but is able to make changes to a DNS cache for the container operating system that is based on the host DNS cache.

In some implementations, as sessions are created between a host operating system and a container operating system, the service version and data schema are also negotiated. The best compatibility may be selected using a priority list that is shared as part of the negotiation or takes an approach to a pre-determined highest common denominator of the compatible version negotiation.

The architecture shown in FIG. 2 illustrates one example embodiment and how it impacts the relationship between the host operating system 104 and the container operating system 102. However, embodiments of the invention may also apply between any two entities that share user access, whether they be a host operating system, a container operating system, a network node (such as a web proxy or firewall), etc.

The container operating system 102 (note that a single container operating system 102 is illustrated, but many embodiments will implement multiple container operating systems, referred to generally as 104) is an entity which is an operating system that runs one or more applications that require isolation from the host operating system 104. The container operating system 102 may also or alternatively be configured to meet additional unique requirements to achieve compatibility including running a different operating system version, having a different configuration and so forth.

In some implementations, a security subsystem negotiates version and data schema for user objects. This may be done by manually looking at the container operating system version or a manifest file to identify a potential list of possible data schemas, or it may be interactive, in which security subsystem on the host operating system 104 directly contacts a security subsystem on the container operating system 102 to share a list of possible data schemas. The best compatibility may be selected using a priority list that is shared as part of the negotiation or takes an approach to a pre-determined highest common denominator of the compatible version negotiation. There may be other approaches such as doing a dynamic analysis of the available data schemas.

The following now illustrates a number of scenarios and environments where some embodiments of the invention may be implemented.

For example, in some embodiments, a container may be used to restrict access, by users at container operating systems, on a corporation's internal network, to resources on the corporation's internal network (or other high-trust network), while allowing the users at container operating systems to have access to certain internet sites. Further, embodiments can simultaneously share DNS cache of only the certain internet sites the container operating system is allowed to see. For example, networks can be classified as "Trusted" (e.g., a corporate network), "Neutral" (used by both corporation network and public internet, such as federation login sites), and "untrusted" or "public". Using embodiments illustrated herein, "Trusted" network names and access are blocked; neutral is shared with the guests using the host DNS cache.

In an alternative or additional embodiment, the host can detect that a bounding reference for container operating system A is correlated to the same object as a bounding reference for container operating system B. However, the guest container operating systems (even when colluding) cannot (from those bounding references) detect that they are correlated to the same object. At the same time, those guest container operating systems are allowed to do direct memory access to the object.

In one embodiment, many server containers may run on a host operating system 104. These server containers may use this system to implement a shared caching service. Caching services reduce application latency for distributed cloud services, web applications, etc. This embodiment may run in a hostile multi-tenant environment, and thus have the same security requirements as other embodiments.

Thus, embodiments may be configured, by implementing principles as described above, to address a threat model that is mostly around information disclosure and elevation of privilege. For example, embodiments are configured to not disclose enterprise data (e.g., enterprise DNS names), while allowing DNS names of the internet to be accessed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Referring now to FIG. 4, a method 400 is illustrated. The method 400 may be practiced in a container based computing environment comprising a computing system having a first operating system and a second operating system. For example, the first operating system may be a host operating system and the second operating system may be a container operating system which uses portions of the host operating system. In an alternative embodiment, both the first and second operating systems may be container operating systems. The method includes acts for providing access control by the first operating system.

The method includes receiving at the first operating system, from the second operating system, a request for a bounding reference to a set having at least one resource (act 402). For example, the resource may be any resource, such as an IP address, a file, a web page, a connection, or virtually any other resource. In the example illustrated above, the host operating system 104 may receive a request from the container operating system 102 for a bounding reference to the internet resource 144.

The method further includes obtaining a first operating system provided bounding reference for the set where the bounding reference is derived from a first operating system resolvable reference to the set (act 404). For example, in the example above, the bounding reference may be the randomized ID correlated to a handle to the internet resource 144.

The method further includes providing the obtained bounding reference to the second operating system (act 406). Thus, as illustrated above, the randomized ID is provided to the container operating system 102.

The method further includes receiving from the second operating system, a request for the set, wherein the request for the set comprises the obtained bounding reference and an identifier identifying the second operating system (act 408). In the example illustrated above, the request for the set is a request for the host operating system 104 to respond to a challenge response received from the web proxy 146.

The method further includes evaluating the obtained bounding reference and the identifier identifying the second operating system (act 410). In the example illustrated above, the host operating system 104 evaluates the randomized ID and the container identifier to determine if it should authenticate the challenge response.

As a result of evaluating the obtained bounding reference and the identifier identifying the second operating system, the method further includes performing a resource control action (act 412). In this case, if the randomized ID and the container identifier all match, then the host operating system 102 will create a challenge-response (which is then sent to the container operating system 102) that allows the container operating system 102 to access the internet resource 144. In general, the resource control action could comprise any one of a number of different actions. For example, the resource control action could include providing the resource to the client. Alternatively or additionally, the resource control action could include providing a token to the resource. Alternatively or additionally, the resource control action could actually include container management. For example, the first operating system could determine that a given container is attempting to perform a Denial of Service (DoS) attack on the host. Thus, for example, if container provides a threshold number of requests using the bounding reference, the host could destroy the container. Alternatively, if there were a desire to allow the container to continue to exist, the host could detect a threshold number of requests and then provide the container with invalid information.

The method 400 may be practiced where the at least one resource comprises an IP address, and the resource control action comprises a DNS resolution.

The method 400 may be practiced where the resource control action comprises providing an authentication token that is configured to allow the second operating system to obtain one or more items from a third entity. For example, the token may be used to obtain web page data, files, images, connections, or other items.

The method 400 may be practiced where the resource control action comprises facilitating a time server. For example, the resource may be a time from a time server. The actions above may be implemented to determine whether or not the second operating system can access time from the time server.

The method 400 may be practiced where the obtained bounding reference comprises a universal identifier of an actual access location for the at least one resource. For example, in some embodiments, the bounding reference may be sent un-obfuscated to the second operating system. For example, if there is no need to hide the actual location of the resource, then a direct reference could be provided.

However, typically the method 400 will be practiced where the obtained bounding reference comprises a universal identifier of an access location that does not correspond to the at least one resource, but rather is an obfuscated reference configured to prevent the bounding reference from being used to obtain the at least one resource when presented by entities other than the second operating system. For example, a randomized ID as described above may be generated as the bounding reference. Alternatively, in some embodiments, the bounding reference may point to an actual resource, but not the set or the at least one resource. For example, in some embodiments, the universal identifier may point to a so-called "honeypot" that can be used to detect when a bounding reference is being misused. For example, in a system where the resource is to be accessed only through the first operating system, attempts by the second operating system to access the resource directly using the universal identifier of an access location that does not correspond to the at least one resource, may indicate that the second operating system has been compromised. In some embodiments, the first operating system can then take appropriate actions, such as terminating the second operating system or limiting its functionality.

The method 400 may further include identifying a time quantum associated with the obtained bounding reference; associating the at least one resource with the time quantum; and wherein performing a resource control action includes providing the at least one resource to the second operating system so long as the act of receiving from the second operating system, the request for the set is performed within the time quantum. For example, some embodiments may be configured to return certain data that only correlates to a given bounding reference provided within the time quantum. To obtain updated data may require a new bounding reference applying to a fresher time quantum.

Note that the resource control action could be, or could result in several alternative or additional actions such as, (but not limited to) one or more of the following. The method 400 may be practiced where the resource control action includes terminating the second operating system. The method 400 may be practiced where the resource control action includes denying current (and/or future) access to the resource or resource type. The method 400 may be practiced where the resource control action includes automatic denial of service mitigation, such as reducing hardware or other resource access to the container operating system 102. The method 400 may be practiced where the resource control action includes logging, or alerting to the owner of the host operating system 104 and/or the container operating system 102 that there is an issue. The method 400 may be practiced where the resource control action includes triggering a special monitoring action such as a virus scan. The method 400 may be practiced where the resource control action includes labeling or classifying the container operating system 102 as a suspicious type that could result in tougher security policies (e.g. firewall configuration, etc.). While not illustrated here, other embodiments may implement or facilitate other resource control actions.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or a general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, persistent memory, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer. Note that in some embodiments, the host operating system 104 and one or more containers may share media (such as memory, files, storage media) as a resource. In some embodiments, the memory may be encrypted with techniques such as Intel's® Software Guard Extensions (SGX) and AMD's® Secure Encrypted Virtualization (SEV). In this embodiment, if the memory is shared, the encryption key would be shared between the host and the container.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system, comprising:
   one or more processors; and
   a memory having stored thereon instructions that are executable by the one or more processors to configure the computer system to perform:
   receiving, at the first operating system, from the second operating system, a request for a bounding reference to a resource at the first operating system;
   obtaining, at the first operating system, the bounding reference for the resource, wherein the bounding reference corresponds to a reference resolvable by the first operating system to access the resource, and wherein the second operating system is prevented from directly accessing the resource using the bounding reference;
   providing the obtained bounding reference to the second operating system;
   receiving from the second operating system, an access request for the resource, wherein the access request comprises the a copy of the bounding reference and an identifier identifying the second operating system;
   evaluating the copy of the bounding reference and the identifier identifying the second operating system; and
   as a result of evaluating the copy of the bounding reference and the identifier, performing a resource control action with the first operating system.

2. The computer system of claim 1, wherein the resource comprises one or more Internet Protocol (IP) addresses, and the resource control action comprises a Domain Name System (DNS) resolution of the one or more IP addresses.

3. The computer system of claim 1, wherein the resource control action comprises providing an authentication token that is configured to allow the second operating system to obtain one or more data items.

4. The computer system of claim 1, wherein the resource control action comprises facilitating a time server.

5. The computer system of claim 1, wherein the obtained bounding reference comprises a universal identifier of an access location that does not correspond to the resource, but rather is an obfuscated reference configured to prevent the bounding reference from being used to obtain the resource when presented by entities other than the second operating system.

6. The computer system of claim 1, wherein the memory further includes instructions that are executable by the one or more processors to configure the computer system to perform:
identifying a time quantum associated with the bounding reference;
associating the at least one resource with the time quantum; and
wherein performing the resource control action comprises providing the resource to the second operating system so long as the access request for the resource is received within the time quantum.

7. The computer system of claim 1, wherein the resource control action comprises terminating the second operating system.

8. The computer system of claim 1, wherein the memory further includes instructions that are executable by the one or more processors to identify an unexpected communication attempts between the first operating system and the second operating system, and to record the identified unexpected communication attempts to a log.

9. The computer system of claim 1, wherein the memory further includes instructions that are executable by the one or more processors to negotiate service and data schema versions between the first operating system and the second operating system.

10. The computer system of claim 1, wherein the resource control action comprises implementing a shared caching service.

11. A computer system, comprising:
a processor; and
a memory having instructions executable by the processor to cause the computer system to provide:
a host operating system configured to host one or more container operating systems;
a container operating system hosted by the host operating system;
a handle store disposed in the host operating system, wherein the handle store is configured to store a handle to a resource, a bounding reference correlated to the handle, and an identifier identifying the container operating system;
an application in the container operating system, wherein the application is configured to perform a request for the resource to the host operating system, wherein the request comprises the bounding reference to the resource and the identifier identifying the container operating system; and
wherein the host operating system is configured to:
evaluate the bounding reference and the identifier identifying the container operating system in the request from the container operating system; and
as a result of evaluating the bounding reference and the identifier identifying the container operating system, perform a resource control action.

12. The computer system of claim 11, wherein the resource control action comprises providing an authentication token that is configured to allow the second operating system to obtain a resource from a third entity.

13. The computer system of claim 11, wherein the obtained reference comprises a universal identifier of an access location that does not corresponded to the at least one resource, but rather is an obfuscated reference configured to prevent reference from being used to obtain the at least one resource when presented by entities other than the second operating system.

14. A method of providing access control on a computing device having a host operating system hosting a container operating system, the method comprising:
receiving from the container operating system, an access request for a computing resource of the host computing system, the access request having a reference and an identifier of the container operating system, wherein the reference prevents the container operating system from directly accessing the computing resource of the host operating system;
determining, at the host operating system, whether the reference corresponds to the container operating system based on the identifier in the received access request;
and
in response to determining that the reference corresponds to the container operating system,
resolving the reference in the received access request to a handle, pointer, or table entry identifying the computing resource at the host operating system; and
performing a resource control action on the computing resource identified by the handle, pointer, or table entry.

15. The method of claim 14, wherein the computing resource comprises an Internet Protocol (IP) addresses, and wherein the resource control action comprises a Domain Name Resolution (DNS) resolution.

16. The method of claim 14, wherein the resource control action comprises providing an authentication token that is configured to allow the container operating system to retrieve data.

17. The method of claim 14, wherein the resource control action comprises facilitating a time server.

18. The method of claim 14, wherein the reference comprises an identifier of an access location that does not correspond to the computing resource, but rather is an encrypted or obfuscated version of the handle, pointer, or table entry.

19. The method of claim 14, further comprising:
identifying a time period associated with the reference; and
wherein performing the resource control action comprises:
determining whether the time period has elapsed;
in response to determining that the time period has not elapsed, providing the computing resource to the container operating system; and
in response to determining that the time period has elapsed, rejecting the access request to the computing resource.

20. The method of claim 14, wherein the resource control action comprises terminating the container operating system.

* * * * *